US005129154A

United States Patent [19]

Aydelott

[11] Patent Number: 5,129,154

[45] Date of Patent: Jul. 14, 1992

[54] WALL-MARKING DEVICE

[76] Inventor: Richard M. Aydelott, 1600 SE. 140th Ct., Vancouver, Wash. 98684

[21] Appl. No.: 805,588

[22] Filed: Dec. 11, 1991

[51] Int. Cl.[5] .......................... G01B 3/02; A47G 1/20

[52] U.S. Cl. ...................................... 33/613; 248/542; 33/666; 33/577

[58] Field of Search ................. 33/613, 666, 677, 574, 33/577; 248/544, 574, 547, 542

[56] References Cited

U.S. PATENT DOCUMENTS 3,516,165 6/1970 Pfeffer .................................. 33/666
4,455,756 6/1984 Greene .................................. 33/613
4,893,776 1/1990 Floyd ................................ 33/666 X

*Primary Examiner*—Harry N. Haroian
*Attorney, Agent, or Firm*—Chernoff, Vilhauer, McClung & Stenzel

[57] ABSTRACT

A device for marking a wall to indicate where to install an element, such as a nail, to mount an article, such as a picture, in a desired position on the wall. The device includes a rigid handle member interconnected by a pivoting assembly to the upper end of a rigid elongate suspension member. The lower end of the suspension member includes a wall-marking element, such as a sharpened pin, projecting perpendicularly from the rear side of the suspension member, and a catch engaging member directly aligned with the wall-marking element to engage, for example, a strand of wire located behind the picture. While the handle member is pivoted to a ready position out-of-line with the suspension member, the pivoting assembly maintains the rear side of the suspension member in vertically suspended position generally coplanar with the wall so that the pin is positioned properly for accurate marking. During marking a stabilizing mechanism immobilizes the upper portion of the picture. In one distinct type of ready position, the handle member is pivotable off to one side of a plane extending perpendicular to the wall and passing through the longitudinal axis of the suspension member, thereby enabling the picture to be moved to one side of the user for full viewing by an assistant during marking. Desirably, the handle member is angled away from the wall to enable the entire hand to grasp the device. The handle member assumes a folded-up position for covering the pin.

29 Claims, 5 Drawing Sheets

WALL-MARKING DEVICE

BACKGROUND OF THE INVENTION

The present invention relates to wall-marking devices which facilitate the installation of pictures, mirrors, and other wall-mounted articles, particularly where such articles are supported from behind by a catch such as a wire or cord.

An example of one such device is described in Pfeiffer, U.S. Pat. No. 3,516,165. The device comprises, essentially, an elongate ruler including, at its lower end, a hook, from which the picture can be carried. Directly opposite the lowermost portion of the hook is a sharpened point which can be used to make an impression in the wall. Holding the ruler by its upper end, the user moves the picture along the wall until the desired location is reached, whereupon the upper portion of the picture is pressed against the device causing the point to leave a mark on the wall. The mark indicates where to install the picture-hanging element (e.g. a nail or hanger) so that it will hang the picture generally in the desired location. Because of the direct alignment of the hook on one side of the device and the sharpened point on the other, it is possible to obtain relatively accurate positioning of the mark along the vertical direction without the need for guessing, for example, where behind the picture the ends of the picture wire are attached and what amount of vertical offset is needed between these ends and the picture-hanging element to account for the slack in the picture wire.

Along the horizontal direction, however, often the mark does not serve as an accurate indicator of the proper location for the picture hanging element. With the device held straight ahead of the user, for example, it is difficult to detect if the rear side of the ruler is substantially coplanar with the wall. If it isn't, this places the tip of the point in horizontal offset from the base of the point thereby shifting the mark too far off to one side. Alternatively, in selecting the desired location, often the user will move the picture to various trial positions along the wall, each time shifting the picture to one side of his or her body so that an assistant, situated further from the wall, can evaluate the full appearance of the picture at the trial position. When shifting the picture in this manner, however, there is a natural tendency to turn the wrist slightly, which, in turn, tends to cause the sharpened point of the device to turn in a horizontal plane to a new angle no longer directed straight away from the wall. As a result, if the picture is shifted to the right, for example, before marking occurs, the mark tends to be made too far to the right of its proper location, while the converse is true if the picture is first shifted to the left.

In addition to questionable accuracy, there are other problems associated with the Pfeiffer device as well. For example, in order to hold the ruler up close to the wall where the sharpened point can leave its mark, it is necessary to hold the ruler by the fingertips along its thinnest edges. This method of grasping sometimes proves insufficient, particularly when a mirror of larger size is being carried, and too often the ruler will slip from the user's grasp and fall, together with the mirror, to the floor below. Another problem is the excessive length of the device which makes it inconvenient to carry the device about on one's person. Finally, when retrieving the device from storage, too often the user will be stabbed by the sharpened point, particularly where it is necessary to pick the device out from a disorganized clutter of tools. Although Pfeiffer describes a removable cap for shielding the point, this small item is easily misplaced or lost, often making it necessary to store the tool without the desired safeguard.

A somewhat different but related wall-marking device is described in Bendick, U.S. Pat. No. 4,382,337. Like the Pfeiffer device, the Bendick device, at least in one of its embodiments, includes a sharpened point, but here the point projects from a disc-like plate which is suspended from the lower end of a rope. The picture wire is received inside a groove formed along the thick base of the point where it emerges outwardly from the disc.

Although the rope type grip makes the Bendick device easy to collapse and carry, it also requires that the user push on the center of the picture to force the point against the wall. Concern about damage to the picture or breakage of the glass sometimes covering the picture often prevents the user from applying sufficient force to make a noticeable mark on the wall. Moreover, because of the natural tendency of the rope to twist, even when held directly in front of the user, the point will frequently turn within a horizontal plane to an undetected new position at an angle with the wall. Accordingly, the accuracy of the Bendick device is no more reliable than that of the Pfeiffer device. Nor is the rope of sufficient thickness to provide a firm grip, and the device can easily slip from the user's hand when heavily weighted down, such as by a large mirror.

In Greene and Babitz, U.S. Pat. Nos. 4,455,756 and 4,637,583, respectively, an alternative type of picture installing device is described of a fundamentally different character from the type shown in Pfeiffer and Bendick. This alternative type of device does not include a wall-marking element and, therefore, is not a wall-marking device as such. Instead, the hanger that ultimately will attach the picture to the wall is made a detachable part of the device, so that after the picture is lifted with the device by the hanger, and after the device is laid flat against the wall with the picture in its desired position, adhesive on the back of the hanger, coming in contact with the wall, holds the hanger fast to the wall, whereupon the remainder of the device can be uncoupled from the hanger for reuse. In Greene, the hanger is uncoupled from a reusable lower handle by rupturing the adhesive which holds the hanger to the handle. In Babitz, the hanger is uncoupled from a reusable upper strap by swiveling a loop carried at the lower end of the strap out from under a folded-over portion of the hanger.

Although the specific problem of horizontal misalignment of the wall-marking element does not exist in this alternative type of device, the more general problem of inaccuracy in the positioning of the hanger still remains. In particular, while the picture is being shifted to its desired position, but before the picture has exactly reached the desired position, often the exposed adhesive on the rear side of the hanger will bond prematurely to the wall. While it is sometimes possible to remove and relocate the hanger, this cannot be done without a significant risk of causing damage to the surface finish of the wall. Moreover, after being installed for some time, if it becomes necessary to move a picture to a new position, the risk of damage to the wall from removal of the hanger becomes even greater. Another significant limitation of this alternative type of device is the need to replace the hanger, after each installation, with a new hanger, where this new hanger is specially adapted for releasable coupling to the reusable portion of the device, thereby increasing the expense of the device with each installation.

Accordingly, it is an object of the present invention to provide a wall-marking device that, in accordance with the desired position of a picture on the wall, marks, with improved accuracy, the corresponding location on the wall at which to install the picture-hanging element.

A related object of present invention is to provide such a device which will remain accurate even when the user of the device shifts the picture to one side of himself or herself before marking the desired position.

Another object of the present invention is to provide a wall-marking device which, throughout its use, can be gripped securely by the entire hand without exhibiting a tendency to slip or pull away from the hand.

A further object of the present invention is to provide a wall-making device offering both sufficient leverage to leave a conspicuous mark and sufficient compactness to store in a pocket.

Yet another object of the present invention is to provide a wall-marking device of the type employing a sharp point for the wall-marking element in which protection against stabbing injuries is offered without the need for removable and easily lost caps.

SUMMARY OF THE PRESENT INVENTION

In achieving the aforementioned objects, the wall-marking device according to the present invention includes two major components: an elongate rigid handle member for grasping the device and an elongate rigid suspension member that supports the article to be installed. In particular, the article is supported by a catch-engaging element on the suspension member. Directly aligned with the catch-engaging element is a wall-marking element that projects perpendicularly from the rear side of the suspension member at the lower end thereof. The upper end of the suspension member is connected to the lower end of the handle member by a pivot mechanism that will resist movement of the rear side of the suspension member from a suspended position generally coplanar with the wall when the handle member is pivoted about the pivot mechanism from a first position in-line with the suspension member to a second position out-of-line with the suspension member. This ensures that proper alignment is maintained between the tip and the base of the wall-marking element and, in turn, between the tip and the catch-engaging element, thereby improving the accuracy of the device.

The pivoting mechanism desirably will allow pivoting motion to occur so that the handle member will pivot to a grasping position angled away from the wall in order that the handle member can be gripped by the entire hand throughout the marking operation. In accordance with the preferred embodiment of the invention, for example, the pivoting mechanism may include a joint having a predetermined axis of pivot maintainable parallel to the wall and about which the handle member can be pivoted in order to reach the grasping position.

Additionally, the pivot mechanism desirably will allow pivoting motion to occur so that the handle member in the second position lies off to one side of an imaginary plane extending perpendicular to the wall and through the longitudinal axis of the suspension member.

This enables the device to retain its accuracy even when the user has shifted the picture to one side of himself or herself by movement of the handle. In accordance with the preferred embodiment of the invention, for example, the pivoting mechanism may include both a first and a second joint where each has a different axis of pivot.

To enable storage of the device in a compact space, such as a pocket, the pivot mechanism desirably will allow pivoting of the handle member to a folded-up position in which the rear side of the handle member lies flat against and is generally coextensive with the rear side of the suspension member. In this position, to prevent stabbing type injuries where the wall-marking element employs a sharp point, preferably the handle member includes a receiving surface, such as the region around a channel, for covering the point.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
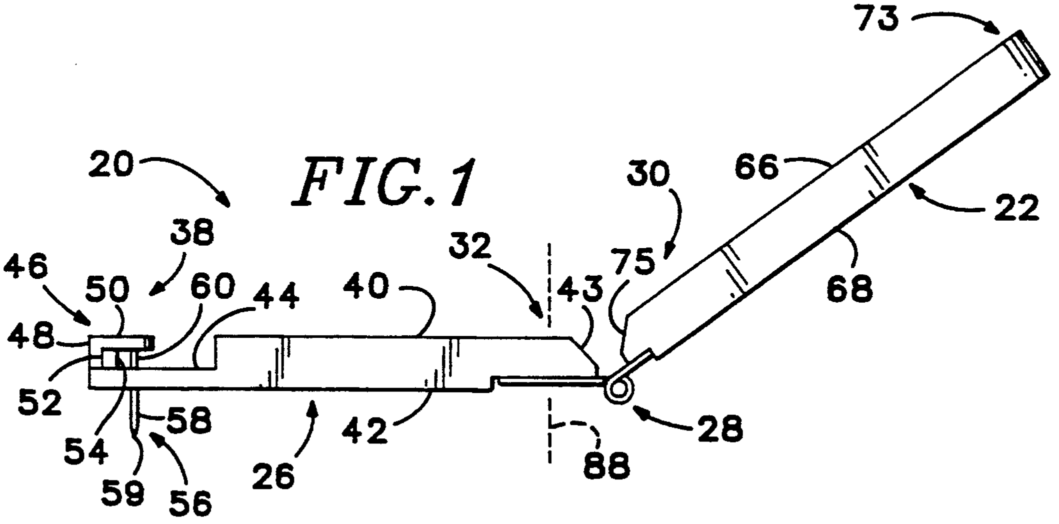
FIG. 1 is a side elevational view of an exemplary wall-marking device, in accordance with the present invention, showing the handle member of the device in a typical pivoted position relative to the suspension member.
Figure 2:
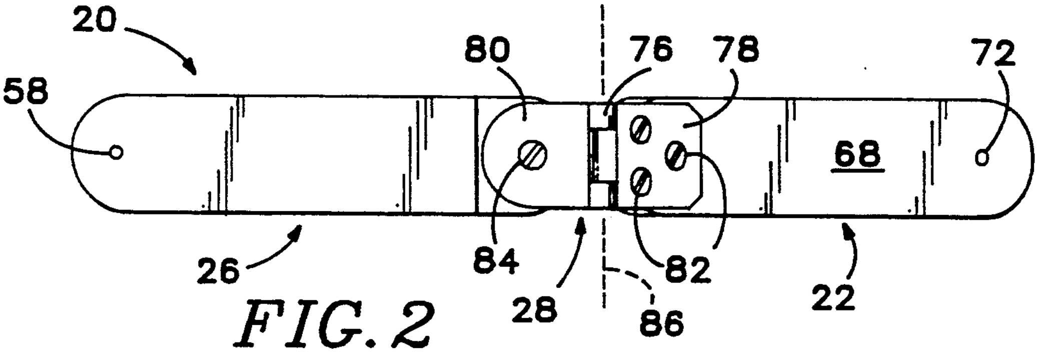
FIG. 2 is a rear elevational view of the device of FIG. 1.

FIGS. 1 and 2 show a side and rear view, respectively, of an exemplary embodiment of a wall-marking device 20 constructed in accordance with the present invention. The exemplary device 20 includes a handle member 22, which is used for grasping the device, a suspension member 26, which is maintained in vertically suspended position while the device is in use, and a pivoting mechanism 28 interconnecting the lower end 30 of the handle member with the upper end 32 of the suspension member. As will be further explained below, with the handle member 22 of the exemplary device 20 held in one of a number of ready positions relative to a wall 34 (FIGS. 3–6), a conventional framed picture 36, engaged to the lower end 38 of the suspension member 26, can be precisely positioned in a desired location against the wall, whereupon pressure exerted against the suspension member by the picture will cause the device 20 to mark the wall. This mark indicates the proper location at which to install a conventional picture-suspending element (not shown), such as a nail or picture hanger, in order that the picture may be mounted to the wall precisely in the desired location.

The suspension member 26 of the exemplary device 20 is elongate in shape so as to have sufficient length to clear the top edge of the largest picture to be mounted while such picture is engaged to the lower end 38 of the suspension member. The suspension member includes a generally flattened front and rear side, 40 and 42, and preferably is formed, together with the handle member 22, of a rigid material such as wood. At the upper end 32 of the suspension member, a beveled edge 43 is formed adjacent the front side 40.

Referring to FIGS. 1 and 2, the lower end 38 of the suspension member 26 includes a stepped portion 44 inwardly offset in planar relationship from the front side 40 of the suspension member. An engagement member 46 of generally L-shaped cross-section is integrally formed on the suspension member with a first leg 48 rising from the stepped portion and a second leg 50 extending over the stepped portion toward the upper end 32 of the suspension member in flush relation with the front side 40 of the suspension member. Extending toward the upper end of the suspension member, an inside portion 52 of the first leg forms a pair of converging faces which intersect along an edge 54.

The wall-marking element 56 of the exemplary device 20 comprises a sharpened metal pin 58 having a tip 59 and an extended base portion 60. The extended base portion of the pin passes through a hole (not shown) defined in the suspension member 26 and is affixed to the second leg 50 of the engagement member 46 in centered relationship over the edge 54, while the remaining portion of the pin 58 extends perpendicularly from the rear side 42 of the suspension member.

Figure 4:
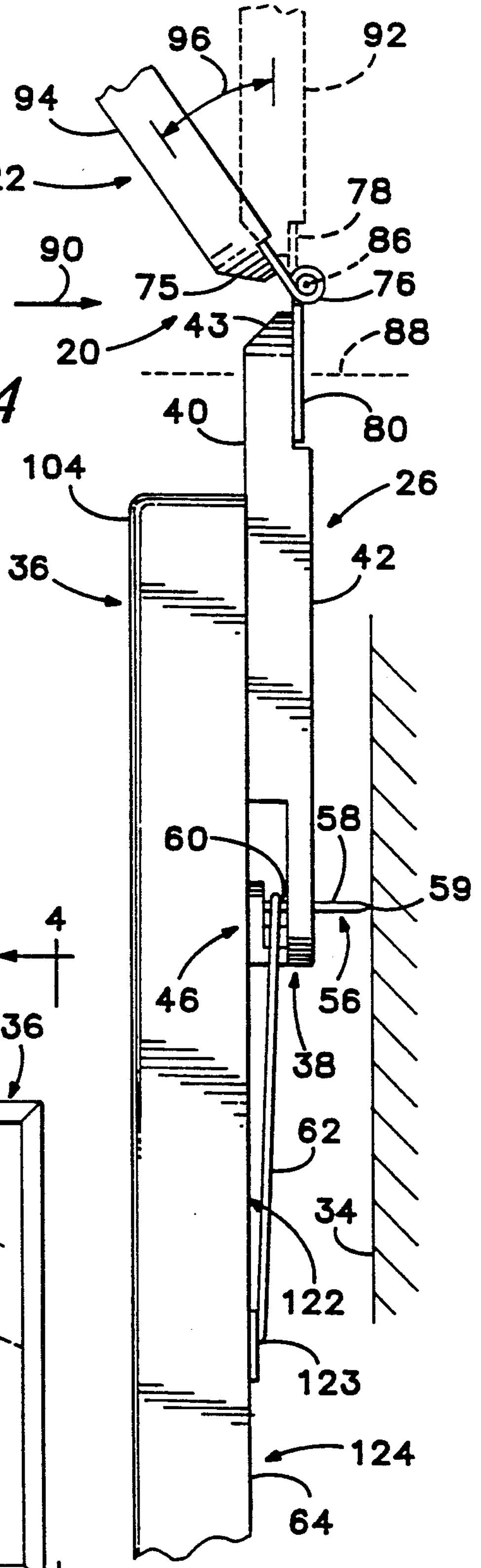
FIG. 4 is a fragmentary side elevational view, enlarged for clarity, taken along lines 4—4 in FIG. 3.
Figure 6:
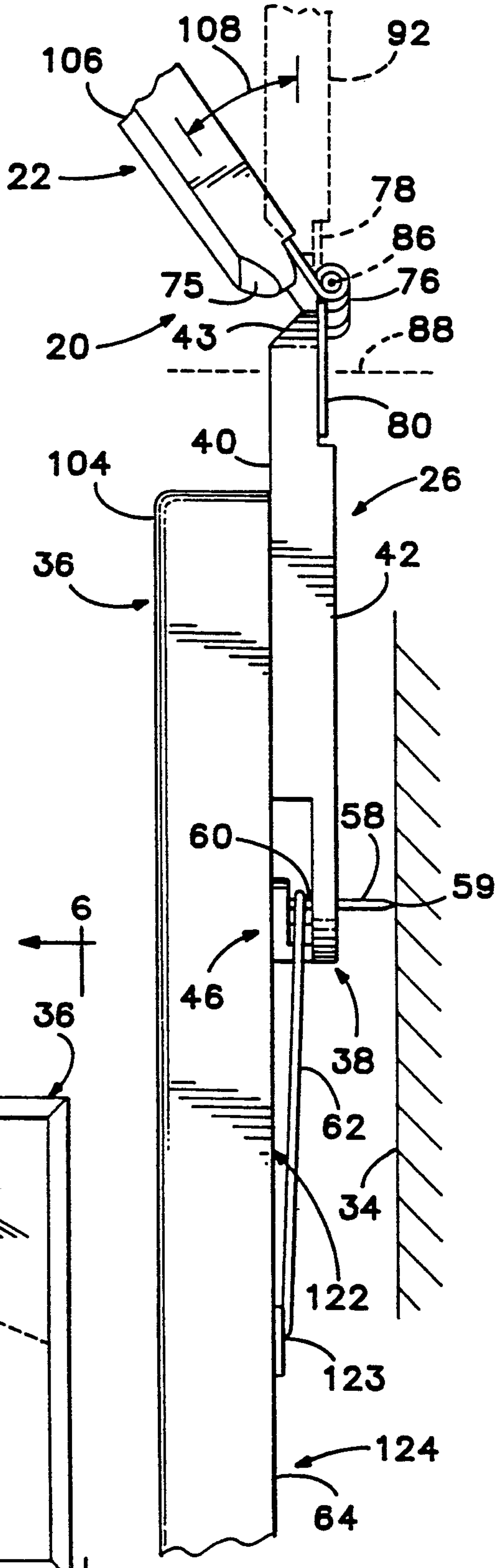
FIG. 6 is a fragmentary side elevational view, enlarged for clarity, taken along line 6—6 in FIG. 5.

As shown in FIGS. 4 and 6, the extended base portion 60 of the pin 58 and the engagement member 46 cooperate together to selectively engage the catch member 62 of the picture 36. The catch member depicted is of the flexible type comprising a strand of wire loosely strung from side-to-side across the back 64 of the picture. For this particular type of catch member, the use of an extended portion 60 of the pin 58 to carry the catch member eliminates the possibility of misalignment between the primary catch engaging member 46 and the wall-marking element 56. In addition, by varying the length of the second leg 50 of the engagement member 46, a strand 62 of any conventional thickness can be retained with security.

Figure 7:
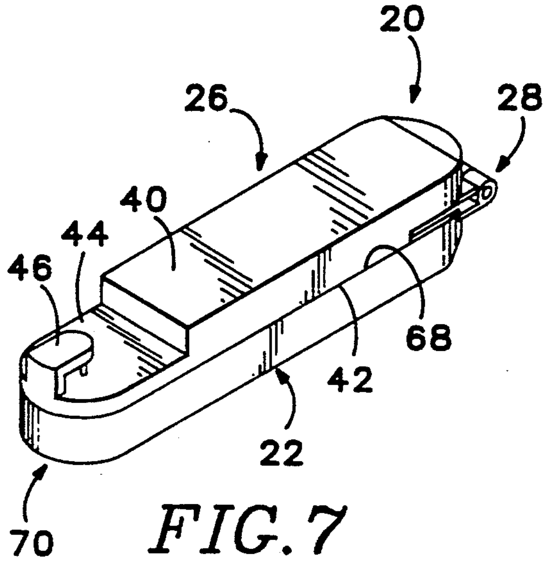
FIG. 7 is a perspective view of the device of FIG. 1 in its folded-up position convenient for carrying.

The handle member 22 of the exemplary device 20 includes a front and rear side 66 and 68 which are of a substantially equal profile with the front and rear sides 40 and 42 of the suspension member 26 in order that the handle member will pivot about the pivoting mechanism 28 to the folded-up position 70 shown in FIG. 7. In this position, the rear side 68 of the handle member 22 lies flat against and is generally coextensive with the rear side 42 of the suspension member 26. Referring to FIGS. 2 and 7 together, a receiving channel 72 is defined in the rear side 68 of the handle member 22, so that upon manipulation of the device into its folded-up position 70, the channel will enclose the sharpened pin 58 and prevent stabbing injuries therefrom. After being folded in this manner, the device is of sufficient compactness to be easily carried about such as in a pocket.

Although not shown in the drawings, to prevent the device from opening, inadvertently, while in its folded-up position 70, a respective strip of VELCRO™ can optionally be mounted along a portion of the rear side 42 of the suspension member 26 and along a corresponding portion of the rear side 68 of the handle member 22. Also, if desired, a hollowed-out compartment can be formed in either the front or rear side of either the suspension member or handle member, and a panel installed to selectively close the compartment, so that a supply of nails, or other type of picture hanging elements, can be conveniently carried on the device.

Figure 3:
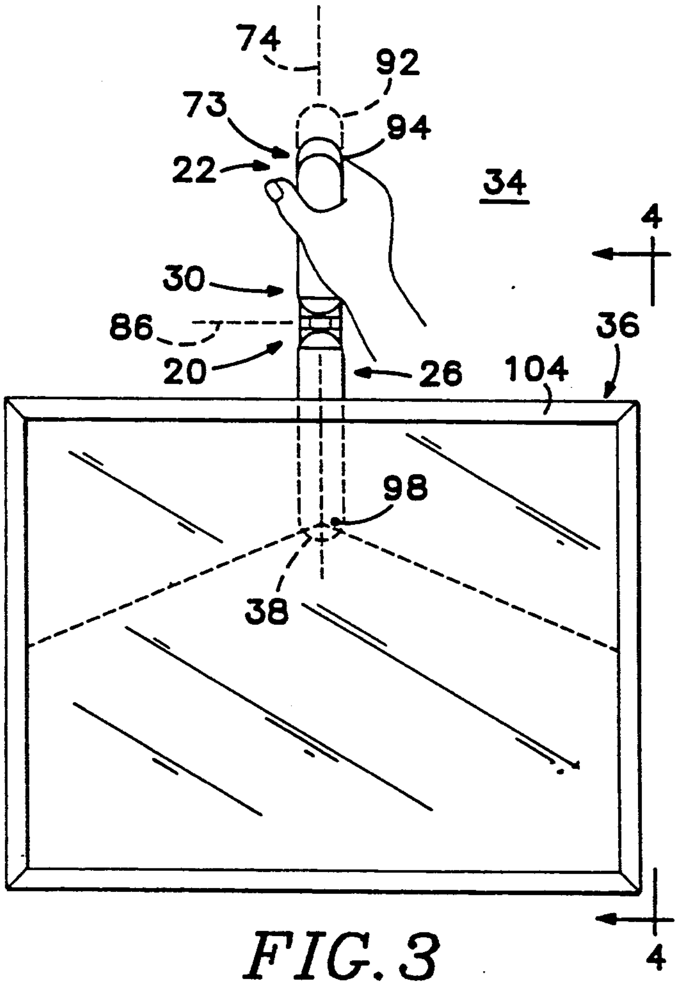
FIG. 3 is a partially schematic front elevational view of the device of FIG. 1 being held by the hand of a user above a wall and carrying a conventional framed picture, where the starting position of the handle member is indicated in dashed line and the ready position of the handle member is indicated in solid line.
Figure 5:
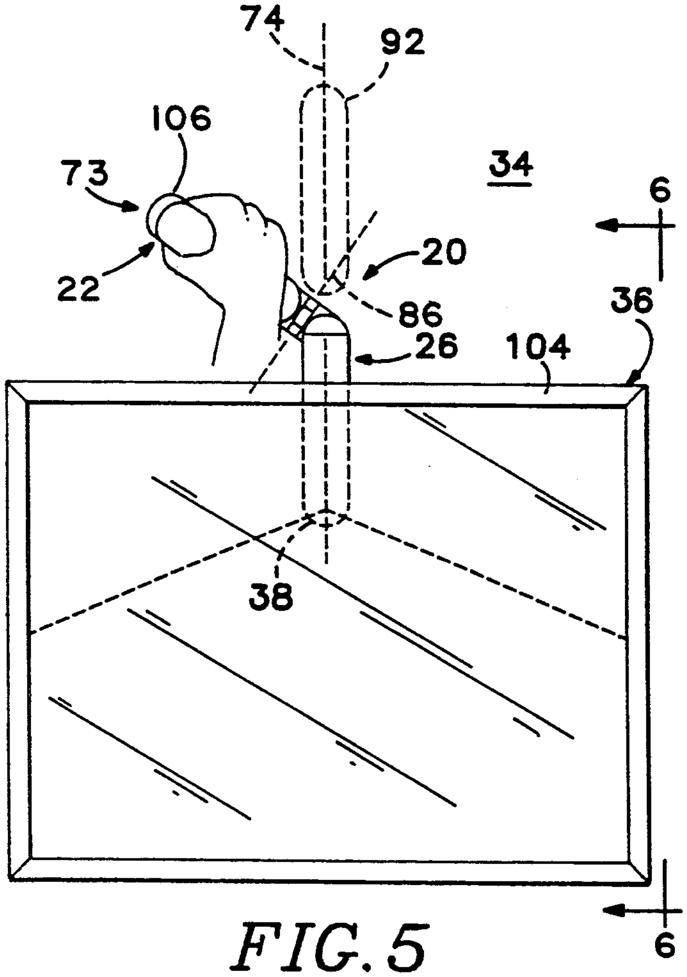
FIG. 5 is similar to FIG. 3 except that it shows an alternative ready position of the handle member.

Regardless of whether the length of the handle member 22 is matched to the length of the suspension member 26, it is desirable that the handle member be of sufficient length for its upper end 73 to visibly protrude from the hand when the entire hand is used for grasping the handle, as shown in FIGS. 3 and 5. This allows the user to easily determine the relative position of the handle with respect to the wall and, in particular, the position of the handle relative to the imaginary plane 74 which passes perpendicular to the wall 34 through the longitudinal axis of the suspension member 26. The significance of this relationship is explained below. A beveled edge 75 is formed on the lower end 30 of the handle member adjacent the front side 66. Stippling or ridges can optionally be formed along the handle member 22 to aid in gripping.

Referring to FIGS. 1 and 2 together, the pivoting mechanism 28 of the exemplary device 20 comprises a hinge 76 having a first end 78 and a second end 80. The first end is fixedly attached, such as by several screws 82, to the handle member 22. The second end is pivotably attached, such as by a single screw 84 installed so as to allow free movement of the second end, to the suspension member 26. Effectively then, the pivoting mechanism provides two movable joints, the first joint having an axis of pivot 86 which is fixed in transverse position relative to the handle member 22 and the second joint having an axis of pivot 88 which is fixed in lateral position relative to the suspension member 26, each axis of pivot extending perpendicular to the other.

To begin use of the exemplary device 20, the user releasably engages the picture 36 to the lower end 38 of the suspension member 26. This is done, as shown in FIG. 4, by placing the wire or catch member 62 of the picture 36 inside the engagement member 46 and over the extended base portion 60 of the sharpened pin 58.

Referring to FIG. 3, the user firmly grasps the handle member 22 with his or her entire hand, as shown. Referring to FIGS. 3 and 4 together, while moving the device in a direction 90 closer to the wall, the user pivots the handle member from a starting position 92 in-line with the suspension member 26 to a ready position 94 out-of-line with the suspension member and extending at an angle 96 away from the wall 34. This opens a space between the handle member 22 and the wall 34 for the user's fingers so that the user can maintain a firm hold on the handle member even when the device is moved close enough to the wall for the tip of the sharpened pin 58 to abut the wall. During this action, the beveled edges 43 and 75 of the suspension member 26 and handle member 22, respectively, enable pivoting to occur over a relatively wide angle so that sufficient space is available regardless of the size of the user's hand.

To ensure precise horizontal positioning of the mark, the handle member 22 is desirably maintained, as shown in FIG. 3, in centered relationship with the imaginary plane 74 passing perpendicular to the wall and through the longitudinal axis of the suspension member 26. This maintains the axis of pivot 86 of the first joint in a position parallel to the wall and perpendicular to the longitudinal axis of the suspension member. Accordingly, turning movement of the rear side 42 of the suspension member 26 about the longitudinal axis of the suspension member can neither occur along the first joint, since its axis of pivot 86 is perpendicular to the longitudinal axis, nor along the second joint, since its axis of pivot is also perpendicular to the longitudinal axis. As a result, the tip 59 of the sharpened pin 58 will not be able to turn in horizontal offset away from the extended base portion 60 of the pin (e.g., to the position indicated by reference numeral 98 in FIG. 3) as final adjustments are being made in the position of the picture 36 in preparation for marking.

Referring to FIG. 4, to ensure precise vertical positioning of the mark, it is desirable to offset the tendency of the suspension member to hang with a slight degree of tilt from the vertical. To some extent this tendency is offset by gently moving the sharpened pin 58 into position directly against the wall just prior to marking. This tendency is further minimized due to the position of the catch engaging elements 46 and 60 in inward offset from the front side 40 of the suspension member 26, which causes the weight of the picture to be carried more nearly in vertical alignment with the second end 80 of the hinge 76.

As a result of keeping vertical tilt of the wall-marking element 56 to a minimum, and as a result of offering a ready position 94 for the handle member 22 in which turning movement of the wall-marking element 56 along the horizontal is prevented, the design of the exemplary wall-marking device 20 enables the point of installation to be marked with improved accuracy. With one hand holding the handle member in ready position, the other hand is used to actually create the mark. In particular, the picture 36 is pressed by this other hand along the upper edge 104 of the picture frame, which forces the sharpened pin 58 to be levered about the axis of pivot 86 of the first joint into shallow penetration of the surface of the wall 34. The device 20 together with the picture 36 is then removed from the wall, and a nail or other type of picture-hanging element (not shown) is installed in the wall in the location marked by the device.

With the handle member 22 in the ready position 94 as shown in FIG. 3, it is relatively easily to verify that the wall-marking element 56 is in its proper marking position or, stated alternatively, that the rear side 42 of the suspension member 26 is in a vertically suspended position coplanar with the wall. For example, a small deviation of the lower end 30 of the handle member 22 off to one side of the suspension member 26 will be readily apparent due to the larger deviation of the upper end 73 of the handle member off to the same side of the suspension member. Furthermore, due to the angled relationship of the elongate handle member 22 with the wall 34, it will be readily apparent whether the handle member extends in a plane which is substantially perpendicular to the wall.

In some instances, an assistant may be available to help assess the suitability of various different positions for the picture. To allow the assistant to evaluate each position based on the fullest possible view of the picture, the user can easily shift the picture to one side of his or her body by pivoting the handle member 22 of the exemplary device 20 to the alternative ready position 106 shown in FIG. 5. In this alternative position, the handle member 22, as before, is out-of-line with the suspension member 26 and, referring to the corresponding side view of FIG. 6, forms an angle 108 relative to the wall. Unlike the ready position 94 shown in FIG. 3, however, here the handle member lies off to one side of the imaginary plane 74 extending perpendicular to the wall and through the longitudinal axis of the suspension member.

If turning of the wrist occurs while moving, for example, the handle member 22 from the ready position 94 shown in FIG. 3 to the alternative ready position 106 shown in FIG. 5, provided that care is taken to maintain the axis of pivot 86 of the first joint parallel to the wall 34, the coupling action provided by the pivoting mechanism of the exemplary device 20 will serve to resist movement of the rear side 42 of the suspension member 26 from its coplanar position with the wall. Referring to FIG. 5, although it is possible for the suspension member 26 to move about the axis of pivot 86 of the first joint to a position where its rear side is not coplanar with the wall, any such movement will ultimately be resisted, because the pull of gravity will tend to force the lower end 38 of the suspension member back to its lowest position. Similarly, referring also to FIG. 6, if the suspension member should happen to turn about the axis of pivot 88 of the second joint, once again the pull of gravity will tend to restore the suspension member to a vertically suspended position. Accordingly, when the picture is shifted off to one side, the natural turning movement of the wrist is fully resolvable by movement of the handle member 22, without detrimental effect on the proper positioning of the suspension member 26 and the accuracy of the device.

Figure 8:
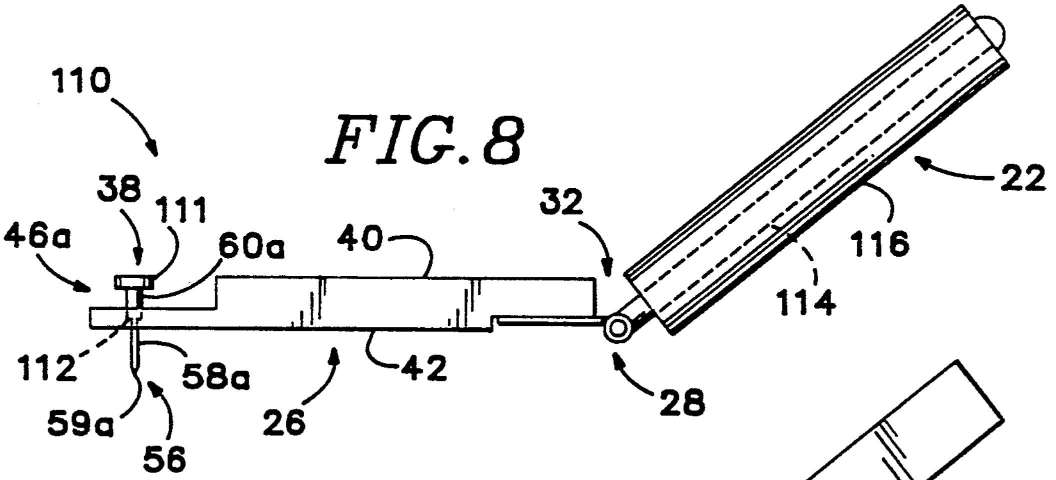
FIG. 8 is a side elevational view of a first alternative type of wall-marking device having a modified form of handle member.
Figure 9:
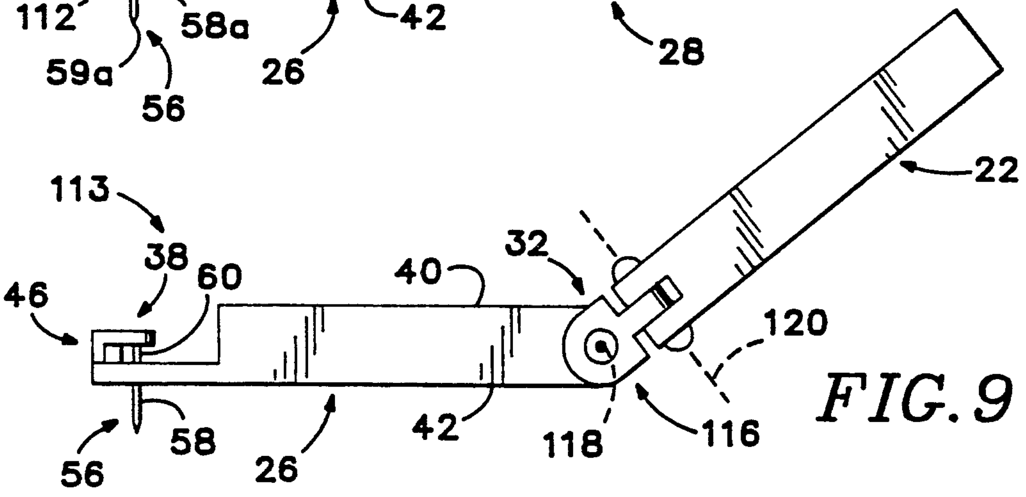
FIG. 9 is a side elevational view of a second alternative type of wall-marking device having a modified form of pivoting mechanism.

Referring to FIGS. 8 and 9, in accordance with the broader aspects of the present invention, two alternative forms of wall-marking device 110 and 112 are illustrated. As between FIGS. 8 and 9 and FIG. 1, the latter figure depicting the exemplary device 20, like reference numerals have been used to denote like elements.

In the first alternative device 110 shown in FIG. 8, it will be recognized that the handle member 22 of the device has been modified so as to include an inner cylindrical core 114 closely surrounded by an elongate outer sheath 116. The outer sheath is rotatable about the inner core and the inner core, in turn, is connected to the pivoting mechanism 28. This construction allows the outer sheath 116 of the handle member to be rotated about its longitudinal axis independent of movement by the suspension member 26 from its desired marking position as the handle member is being held, for example, in the ready position 94 shown in FIG. 3. Accordingly, a greater freedom of wrist movement is possible in the use of this first alternative device 110 without detrimental effect on accuracy.

A second modification made to the first alternative device 110 is that the L-shaped engagement member 46 (FIG. 1) has been replaced by an alternative configuration 46*a* that includes a moderately-enlarged head 111 formed at the end of the extended base portion 60*a* of the pin 58*a*. A stepped-diameter portion 112 is included on the pin, between the tip 59*a* and the enlarged head 111, in order to automatically seat the pin at the correct depth within the suspension member 26. This alternative configuration is useful, for example, if the catch member of the picture, instead of being picture wire, is a hole formed in the back of the picture. However, care must be taken not to press the tip too forcefully against a hard wall so as to prevent the pin from being driven from its hole, nor must articles of excessive weight be carried on the pin to prevent the head from breaking off of the slender pin.

In the second alternative device 113 depicted in FIG. 9, it will be recognized that the pivoting mechanism 116 has been modified so as to incorporate a "universal joint" type of connection. Insofar as this pivoting mechanism 116 includes a first and second joint, in which the first joint has an axis of pivot 118 maintainable parallel to the wall when the handle member 22 is in its ready position (e.g., 94 in FIG. 3), this pivoting mechanism is closely similar, in construction and operation, to the pivoting mechanism 28 of the exemplary device (FIGS. 1 and 2).

Functional differences do still exist between these devices, however, because in the second alternative device 113 the axis of pivot 118 of the first joint is fixed in position relative to the suspension member 26 instead of to the handle member 22, and the axis of pivot 120 of the second joint is fixed in position relative to the handle member 2 instead of to the suspension member 26. As a result, if the handle member 22 of the second alternative device 113 is moved to the ready position 94 as shown in FIG. 3, turning movement by the tip of the sharpened pin 58 in horizontal offset from the extended base portion 60 of the pin will not be absolutely precluded because the suspension member will be able to turn about the axis of pivot 120 of the second joint. Such movement, however, while not absolutely precluded, is still effectively resisted because the pull of gravity will tend to force the lower end 38 of the suspension member 26 to its lowest position so as to maintain the rear side 42 of the suspension member coplanar with the wall. Accordingly, the accuracy of the second alternative device 113 can equal that of the exemplary device 20, particularly if this second alternative device is shaken slightly before the mark is made to counteract the effects of any frictional dragging at the joints.

Referring to FIGS. 4 and 6, occasionally a picture 36, or other type of article, is supported by a flexible catch member 62 which is attached to the picture in such a manner that the weight of the upper portion 122 of the picture above the point of attachment 123 is nearly equal to or exceeds the weight of the lower portion 124 of the picture below the point of attachment. In this instance, the picture 36 will be prone to tilt away from the front side 40 of the suspension member 26. Although the user can overcome this tilt by grasping the side of the picture 36 with his or her free hand and forcing the back 64 of the picture against the front side of the suspension member 26, this approach tends to pivot the suspension member away from its suspended position generally aligned with the vertical, thereby creating a degree of vertical offset between the tip 59 and the base portion 60 of the wall-marking element 56 so that the vertical accuracy of the device 20 is impaired. Moreover, with this approach, as one hand is needed to grasp the side of the picture 64 and the other hand is needed to grasp the handle member 22, no hand is left free to apply a force directly opposite to the front side 40 of the suspension member, so that driving of the pin 58 into a wall 34 of more than moderate hardness cannot be done with sufficient force to leave a readily visible mark.

Figure 10:
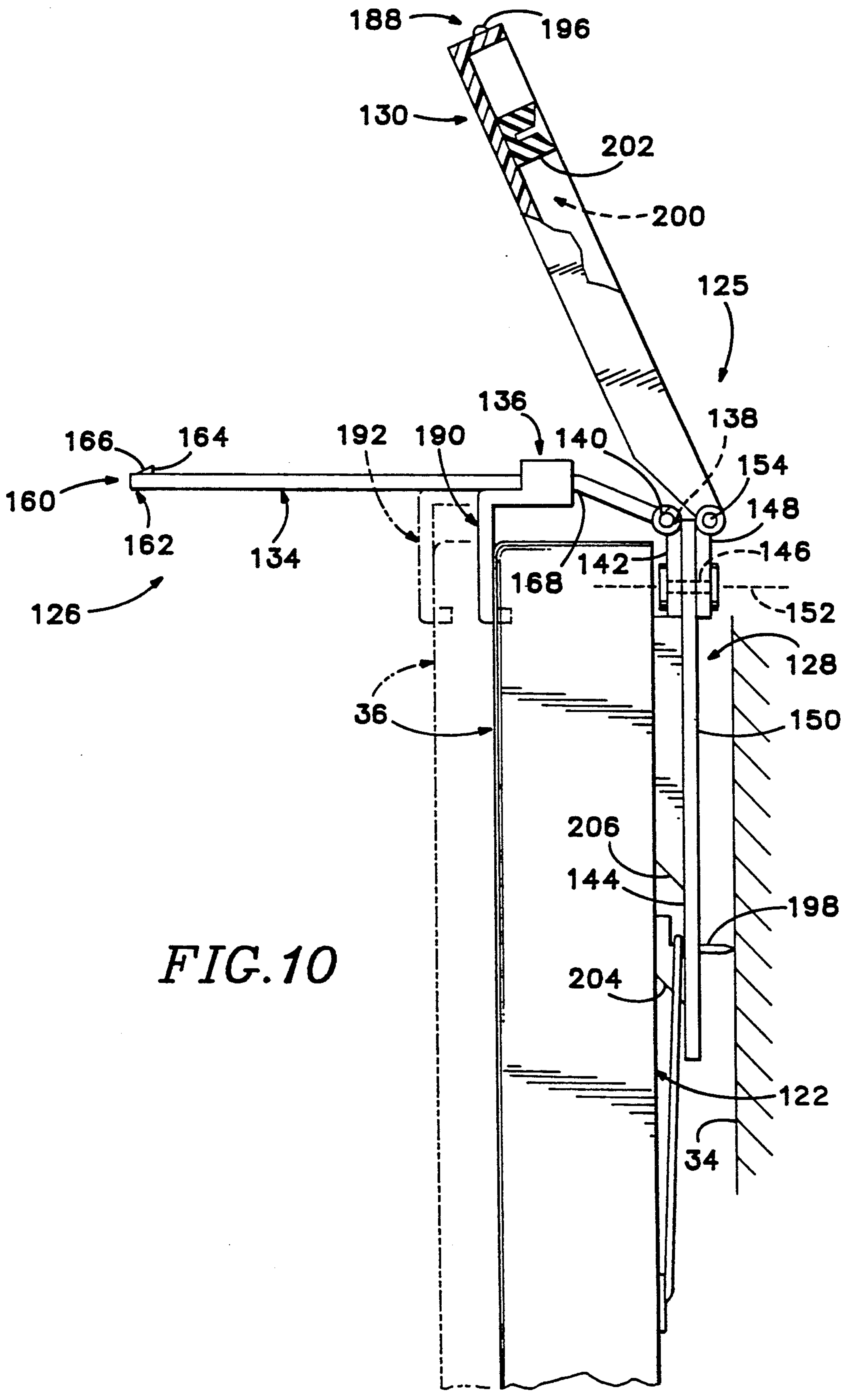
FIG. 10 is a side elevational view of a third alternative type of wall-marking device positioned adjacent to a wall where a portion of the handle is broken away to reveal underlying structure and where a stabilizing mechanism is being used to hold a picture against the device.

Referring to FIG. 10, a third alternative embodiment 125 of the exemplary device is shown that addresses this particular problem as well as the problem of inadvertent opening of the device after the device has been brought to its folded-up position 70 shown in FIG. 7. The third alternative device 125 includes a stabilizing mechanism 126 that detachably connects, as needed, to the lower elongate suspension member 128 of the device in order to stabilize the upper portion 122 of the picture 36 which is of the top-heavy type above described, and that further cooperates, as shown in FIG. 11, with the handle member 130 of the device in order to maintain the device in its folded-up position 132.

Figure 12:
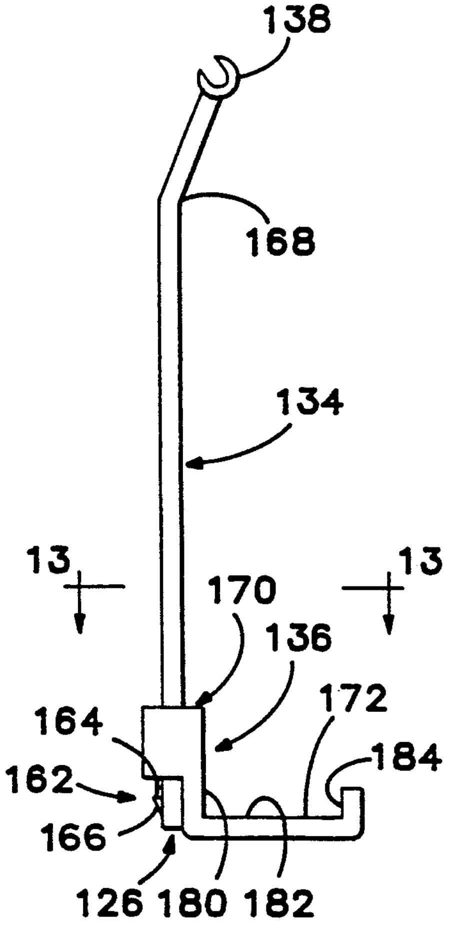
FIG. 12 is a side elevational view of the detachable stabilizing mechanism of the device of FIG. 10.
Figure 13:
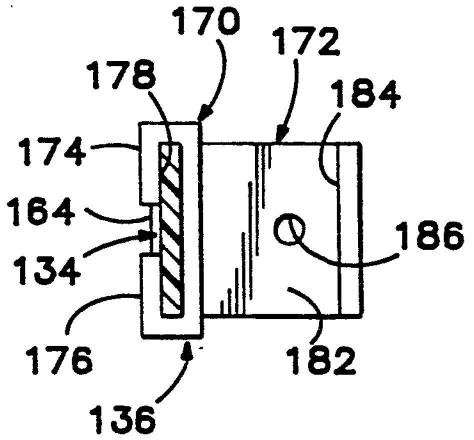
FIG. 13 is a sectional view taken along lines 13—13 of FIG. 12.

Referring now to FIGS. 12 and 13, the exemplary stabilizing mechanism 126 includes a stiff elongate strap-like arm 134 molded of a suitably tough polymer, which serves as a guide for a slidable brace 136 which is separately molded from a similar material. Centered at one end of the elongate arm 134 is a claw 138 which enables the arm to be detachably coupled, as shown in FIG. 10, to a central shaft 140 that is provided at the end of a first hinge-type connector 142. The first hinge-type connector is pivotably mounted, in turn, to the front side 144 of the suspension member 128 by a pivot 146 which passes through the first hinge-type connector, the suspension member, and a second hinge-type connector 148 mounted on the rear side 150 of the suspension member. This second hinge-type connector pivotably supports the upper elongate handle member 130 and enables movement of the handle member, in a like manner to that earlier described, about a first and second axis of pivot 152 and 154.

Figure 11:
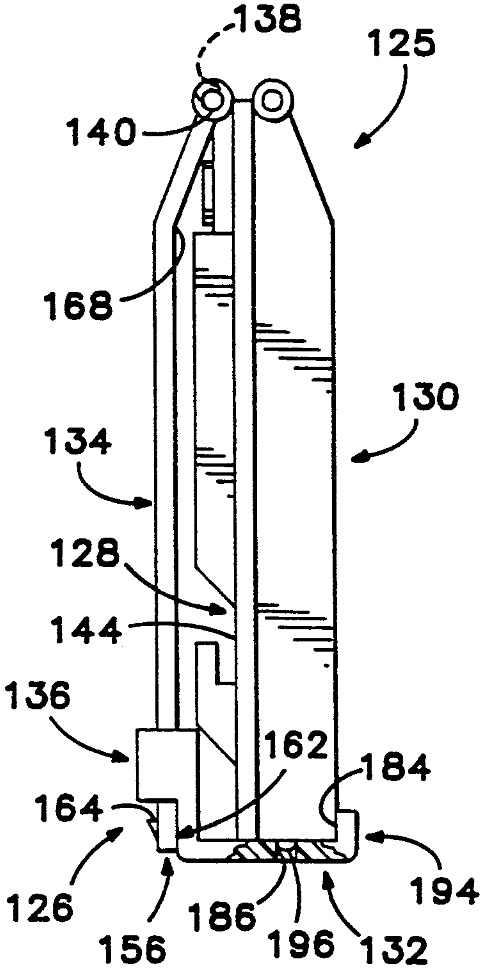
FIG. 11 is a side elevational view, partially broken away, of the device of FIG. 10 but where the stabilizing mechanism is being used to hold the device in its folded-up position.

Referring to FIGS. 10 and 11 together, the first hinge-type connector 142 enables pivoting movement of the elongate guide arm 134, due to turning movement of the claw 138 about the central shaft 140, from a storage-assist position 156 that extends adjacent the front side 144 of the suspension member 128 (FIG. 11) to a stabilizing-assist position 160 that extends generally perpendicular to the suspension member (FIG. 10). At the other end 162 of the guide arm opposite the claw 138, the guide arm includes a ramp 164 having a sloping face 166 inclined toward the other end. A bend 168 is formed in the guide arm proximate the claw 138 so that when the guide arm is moved to its storage-assist position 156, the portion of the arm extending between the bend and the other end 162 lies above the structure mounted on the front side 144 of the suspension member 128.

Referring to FIG. 12, the slidable brace 136 includes an upper slide portion 170 and a lower brace portion 172. Referring also to FIG. 13, the upper slide portion 170 includes an opposed pair of legs 174 and 176 that define the entrance to a split channel 178 of rectangular cross-section that is formed by the upper slide portion. The lower brace portion 172 is generally U-shaped and includes an inside finger 180 which extends outwardly from the upper slide portion 170 and parallel to the split channel 178, a crosspiece 182 which extends perpendicularly from the inside finger 180 and away from the upper slide portion, and an outside finger 184 which extends perpendicularly from the crosspiece 182 in opposed relation to the inside finger 180. An opening 186 is formed through the crosspiece as shown in FIG. 13.

Referring to FIGS. 12 and 13 together, to assemble the slidable brace 136 and the guide arm 134, the end 162 of the guide arm that includes the ramp 164 is inserted through the split channel 178 so that the outside finger 184 of the slidable brace 136 extends toward the claw 138 of the guide arm. During this process, the legs 174 and 176 of the slidable brace flex somewhat as they travel over the sloping face 166 of the ramp 164 and then snap back into place when the ramp clears the split channel 178 so that the slidable brace 136 is locked onto the guide arm.

The dimensions of the split channel 178 are conformed to those of the guide arm 134 to selectably enable bidirectional movement of the slidable brace 136 along the guide arm in response to manipulation by the user while, at the same time, enabling the slidable brace to normally maintain its position on the guide arm due to a moderately tight fit between the slidable brace and guide arm. In particular, referring to FIG. 10, when the upper handle member 130 is brought to its ready position 188 extending obliquely to the lower suspension member 128, and when the guide arm 134 is brought to its stabilizing-assist position 160 extending generally perpendicular to the lower suspension member, the slidable brace 136 can be moved to a selected one of numerous stabilizing positions, such as the inner or outer stabilizing position 190 or 192, which are shown in solid line and dashed line view, respectively, depending on whether the picture 36 has a correspondingly thin or thick upper portion 122. After the user has moved the slidable brace 136 to an appropriate stabilizing position as depicted, the slidable brace immobilizes the upper portion 122 of the picture in a position closely adjacent to the front side 144 of the lower suspension member 128 so that tilting of the picture from the device 125 cannot occur.

Alternatively, referring to FIG. 11, when the upper handle member 130 is brought to its folded-up position 132 and the guide arm 134 is brought to its storage-assist position 156 (i.e., after the slidable brace 136 has been moved into a position immediately adjacent the ramp 164), the slidable brace can be shifted a small distance away from the ramp to the clasping position 194 as shown. In this clasping position, the opening 186 formed in the crosspiece 182 of the slidable brace engages a matching detent 196 that is formed on the upper end of the handle member 130 and the outside finger 184 of the slidable brace clutches the upper handle member so that the device 125 is maintained in its folded-up position 132 and stabbing injuries from the wall-marking pin 198 (FIG. 10) cannot occur.

Referring to FIG. 10, in addition to including a stabilizing mechanism 126, the third alternative embodiment 124 of the exemplary device also includes other modifications of a less substantial character. For example, the upper handle member 130 has a hollowed-out longitudinal central portion 200 to conserve on weight and a separate slotted block 202 is mounted inside this hollowed-out portion to cover the wall-marking pin 198 when the handle member is brought to its folded-up position 132 (FIG. 11). Also, the engagement member 204 on the front side 144 of the suspension member is completely separate from the pin 198 and the front side 144 further includes a resilient pad 206 to cushion the picture 36 when the picture is pressed against the suspension member 128 during marking of the wall 34.

While, in accordance with the present invention, an exemplary form of the wall-marking device 20 has been described, together with alternative forms of the device 110, 113, and 125, it will be recognized that further alternative forms are possible without departing from the broader principles of the present invention. For example, with a certain degree of loss in functionality, a broad flexible strap can be substituted for the joint-type pivoting mechanisms which have been described. Another possible modification is to use a different type of wall-marking element, such as an ink-bearing cartridge. The catch engaging mechanism, furthermore, can be adapted to engage whatever form of catch member is being used. Concerning the stabilizing mechanism of the third alternative embodiment of the exemplary device, it will be recognized that the guide arm, slidable brace and the interconnecting portions therebetween are not limited to having the exact forms which have been depicted and described, but that other forms can be advantageously employed provided that such other forms offer the same principal functions as the stabilizing mechanism described.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for marking the location on a wall where an article-hanging element is to be installed, the article being of the type which is supported from behind by a catch included on the back of the article, said device comprising:

(a) an elongate rigid suspension member having a front and rear side and an upper and lower end;

(b) a wall-marking element projecting perpendicularly from the rear side of said suspension member at the lower end of said suspension member;

(c) catch engaging means on said suspension member directly aligned with said wall-marking element for engaging said catch in support of said article while the back of said article faces the front side of said suspension member;

(d) an elongate rigid handle member having an upper and lower end providing means for grasping said device in order to support said article in a desired position; and (e) pivot means interconnecting the lower end of said handle member and the upper end of said suspension member for resisting movement of the rear side of said suspension member from a vertically suspended position generally coplanar with said wall while said handle member is pivoted about said pivot means to grasping position angled away from said wall, whereupon by pushing said article against said suspension member, said wall-marking element will leave a mark on said wall at that same location which said article-hanging element would occupy if said article were supported in said desired position by said article-hanging element.

2. The device of claim 1 wherein said wall-marking element includes a tip and a base portion and said pivot means includes means for preventing horizontal offset between said tip and said base portion of said wall-marking element when said grasping position is in alignment with an imaginary plane extending perpendicular to said wall and through the longitudinal axis of said suspension member.

3. The device of claim 1 wherein said handle member is rotatable about its longitudinal axis independent of movement by said suspension member from said suspended position.

4. The device of claim 1 wherein said handle member includes a rear side and said pivot means includes means for pivoting said handle member to a folded-up position in which the rear side of said handle member lies flat against and is generally coextensive with the rear side of said suspension member.

5. The device of claim 4 wherein said handle member includes means for substantially enclosing said wall-marking element in response to said handle member being pivoted to said folded-up position.

6. The device of claim 1 wherein said catch engaging means is offset inwardly from the front side of said suspension member.

7. The device of claim 1, said article further being of the type having an upper portion above said catch, wherein said device further includes stabilizing means coupled to said suspension member for selectively immobilizing the upper portion of said article relative to said suspension member.

8. A device for marking the location on a wall where an article-hanging element is to be installed, the article being of the type which is supported from behind by a catch included on the back of the article, said device comprising:

(a) an elongate rigid suspension member having a front and rear side and an upper and lower end;
(b) a wall-marking element projecting perpendicularly from the rear side of said suspension member at the lower end of said suspension member;
(c) catch engaging means on said suspension member directly aligned with said wall-marking element for engaging said catch in support of said article while the back of said article faces the front side of said suspension member; (d) an elongate rigid handle member having an upper and lower end providing means for grasping said device in order to support said article in a desired position; and
(e) pivot means interconnecting the lower end of said handle member and the upper end of said suspension member for resisting movement of the rear side of said suspension member from a suspended position generally coplanar with the wall while said handle member is pivoted about said pivot means from a first position in-line with said suspension member to a second position out-of-line with said suspension member, whereupon by pushing said article against said suspension member, said wall-marking element will leave a mark on said wall at that same location which said article-hanging element would occupy if said article were supported in said desired position by said article-hanging element.

9. The device of claim 8 wherein said pivot means includes a joint having an axis of pivot that is fixed relative to at least one of said handle member and said suspension member.

10. The device of claim 8, wherein said axis of pivot is perpendicular to the longitudinal axis of said suspension member when said handle member is in said first position.

11. The device of claim 8 wherein said handle member in said second position extends at an angle relative to the wall.

12. The device of claim 8 wherein said handle member in said second position lies off to one side of an imaginary plane extending perpendicular to the wall through the longitudinal axis of said suspension member.

13. The device of claim 8 wherein said handle member in said second position lies within an imaginary plane extending perpendicular to the wall through the longitudinal axis of said suspension member.

14. The device of claim 8 wherein said pivot means includes a first joint having an axis of pivot maintainable parallel to the wall while said handle member is pivoted from said first position to said second position.

15. The device of claim 14 wherein said axis of pivot is fixed relative to said handle member.

16. The device of claim 14 wherein said axis of pivot is fixed relative to said suspension member.

17. The device of claim 14 wherein said pivot means includes a second joint having an axis of pivot maintainable perpendicular to the wall while said handle member is pivoted from said first position to said second position.

18. The device of claim 8 wherein said pivot means includes a first and second joint each having a different axis of pivot.

19. A device for marking the location on a wall where an article-hanging element is to be installed, the article being of the type which is supported from behind by a catch included on the back of the article, said device comprising:

(a) a lower member having a front and rear side;
(b) a wall-marking element projecting from the rear side of said lower member and including a tip;
(c) catch engaging means on said lower member directly aligned with said wall-marking element for engaging said catch in support of said article while the back of said article faces the front side of said lower member; (d) an upper member having a receiving side defining a channel; and
(e) means interconnecting said upper and lower members for selectively pivoting said lower member into a folded-up position adjoining said upper member, said tip of said wall-marking element being inserted into said channel defined in the receiving side of said upper member when said lower member is in said folded-up position.

20. The device of claim 19 wherein said wall-marking element is elongate and said pivoting means has an axis of pivot perpendicular to the longitudinal axis of said wall-marking element.

21. The device of claim 19 wherein said pivoting means includes a first and second joint each having a different axis of pivot.

22. A device for marking the location on a wall where an article-hanging element is to be installed, the article being of the type having an upper portion and being supported from behind by a catch included on the back of the article below the upper portion said device comprising:

(a) a lower member having a front and rear side;

(b) a wall-marking element projecting from the rear side of said lower member;

(c) catch engaging means on said lower member directly aligned with said wall-marking element for engaging said catch in support of said article while the back of said article faces the front side of said lower member; and (d) stabilizing means coupled to said lower member for selectively immobilizing the upper portion of said article relative to said lower member.

23. The device of claim 22 wherein said stabilizing means includes a slide mounted for bidirectional movement.

24. The device of claim 23 wherein said stabilizing means further includes guide means coupled to said lower member for guiding said slide in bidirectional movement.

25. The device of claim 22 wherein said stabilizing means includes a guide having a plurality of stabilizing positions each corresponding to a different thickness for the upper portion of said article and a slide movable along said guide to a selected one of said stabilizing positions for engagement with the upper portion of said article.

26. The device of claim 22 wherein said lower member is elongate and further including an elongate upper member having an end pivotably connected to said lower member for movement alternately between a ready position extending obliquely to said lower member and a folded-up position extending adjacent the rear side of said lower member and covering said wall-marking element.

27. The device of claim 26 wherein said stabilizing means includes an elongate arm having an end pivotably connected to said lower member for movement between a stabilizing-assist position extending generally perpendicular to said lower member and a storage-assist position extending adjacent the front side of said lower member.

28. The device of claim 27 wherein said stabilizing means includes a slide alternately movable along said arm between a first position for engaging said article when said arm is in said stabilizing-assist position and a second position for engaging said upper member when said arm is in said storage-assist position and said upper member is in said folded-up position.

29. The device of claim 22 wherein said stabilizing means is detachably coupled to said lower member.

* * * * *